US008776070B2

(12) United States Patent
Furuichi et al.

(10) Patent No.: US 8,776,070 B2
(45) Date of Patent: Jul. 8, 2014

(54) METHOD AND APPARATUS HAVING RESISTANCE TO FORCED TERMINATION ATTACK ON MONITORING PROGRAM FOR MONITORING A PREDETERMINED RESOURCE

(75) Inventors: Sanehiro Furuichi, Kanagawa (JP); Masami Tada, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/115,498

(22) Filed: May 25, 2011

(65) Prior Publication Data

US 2011/0296426 A1 Dec. 1, 2011

(30) Foreign Application Priority Data

May 25, 2010 (JP) ................................ 2010-118879

(51) Int. Cl.
*G06F 9/46* (2006.01)
(52) U.S. Cl.
USPC .......................................... 718/102; 718/104
(58) Field of Classification Search
None
See application file for complete search history.

(56) References Cited

U.S. PATENT DOCUMENTS

| | | | | |
|---|---|---|---|---|
| 5,126,541 A | * | 6/1992 | Shinagawa | 235/438 |
| 6,178,529 B1 | * | 1/2001 | Short et al. | 714/51 |
| 6,385,721 B1 | | 5/2002 | Puckette | |
| 7,243,267 B2 | * | 7/2007 | Klemm et al. | 714/38.11 |
| 7,650,536 B2 | * | 1/2010 | Takahasi et al. | 714/15 |
| 2007/0234119 A1 | * | 10/2007 | Takahasi et al. | 714/25 |

FOREIGN PATENT DOCUMENTS

| | | |
|---|---|---|
| JP | 10214208 A | 8/1998 |
| JP | 2004246439 A | 9/2004 |
| JP | 2005166051 | 6/2005 |
| JP | 2006092057 A | 4/2006 |

* cited by examiner

Primary Examiner — Van Nguyen
(74) Attorney, Agent, or Firm — Convergent Law Group LLP

(57) ABSTRACT

Exemplary embodiments include a method and system having resistance to a forced termination attack on a monitoring program for monitoring a predetermined resource. Aspects of the exemplary embodiment include a device that executes a predetermined process including a monitoring program that monitors a predetermined resource, wherein the predetermined process is a process for which the predetermined resource becomes unavailable in response to termination of the predetermined process; a program starting unit for starting the monitoring program in response to an execution of the predetermined process; and a terminator for terminating the predetermined process in the case where the monitoring program is forcibly terminated from the outside.

4 Claims, 8 Drawing Sheets

METHOD AND APPARATUS HAVING RESISTANCE TO FORCED TERMINATION ATTACK ON MONITORING PROGRAM FOR MONITORING A PREDETERMINED RESOURCE

CROSS-REFERENCE TO RELATED APPLICATIONS

This application claims the benefit of foreign priority under 35 USC §119 to Japanese Patent Application JP2010-118879, filed May 25, 2010, which is incorporated herein by reference.

FIELD OF THE INVENTION

The present invention relates to a device having resistance to a forced termination attack on a monitoring program for monitoring a predetermined resource.

BACKGROUND

Along with the rapid development of the Internet technology, there has been an increase in the type of attacks from the outside on computers connected via a network. In recent years, in order to resist attacks from the outside via the network, a monitoring program is continuously running with taking action such as obstructing detected access in the case of detecting unpermitted access from the outside to prevent attacks from the outside.

In many cases, the monitoring program uses a resident-type process to monitor file replication into a USB memory, to monitor a print job, or the like. Therefore, in the case where the resident-type process itself is forcibly terminated from the outside, the monitoring function becomes ineffective problematically.

For example, Japanese Patent Application JP10214208 discloses a method in which a dedicated process monitors a monitoring target process and restarts the process in the case of an abnormal end. Japanese Patent Application JP 2004246439 discloses a method in which a plurality of hosts mutually monitor programs to release a resource in a forcibly terminated process. Patent Japanese Patent Application JP2006-092057 discloses a method of causing exception handling to be reliably performed in the case where a process is forcibly terminated. None of these methods, however, are able to prevent a forced termination attack from the outside on a process itself which monitors a process.

Therefore, the forced termination attack from the outside has been avoided by inhibiting a general user from forcibly terminating the resident-type process such as, for example, by causing a monitor process to run as a service process which runs on the system authority in order to prevent the resident-type process itself from being forcibly terminated from the outside.

Even if, however, the monitor process is made to run as a service process which runs on the system authority, the monitor process might be easily forced to be terminated and the memory content might be altered or the like in the case where a user who has obtained the system authority by means of so-called "impersonation" launches a forced termination attack on the process.

Further, for example, as disclosed in Japanese Patent Application JP2000-215065 (U.S. Pat. No. 6,385,721B1), it is also conceivable to protect the monitor process by using a hibernation partition which is hidden from the operating system. This, however, requires the presence of the hibernation partition and lacks versatility enabling the application to all kinds of operating systems.

BRIEF SUMMARY

Exemplary embodiments include a method and system having resistance to a forced termination attack on a monitoring program for monitoring a predetermined resource. Aspects of the exemplary embodiment include a device that executes a predetermined process including a monitoring program that monitors a predetermined resource, wherein the predetermined process is a process for which the predetermined resource becomes unavailable in response to termination of the predetermined process; a program starting unit for starting the monitoring program in response to an execution of the predetermined process; and a terminator for terminating the predetermined process in the case where the monitoring program is forcibly terminated from the outside.

DETAILED DESCRIPTION

Figure 1:
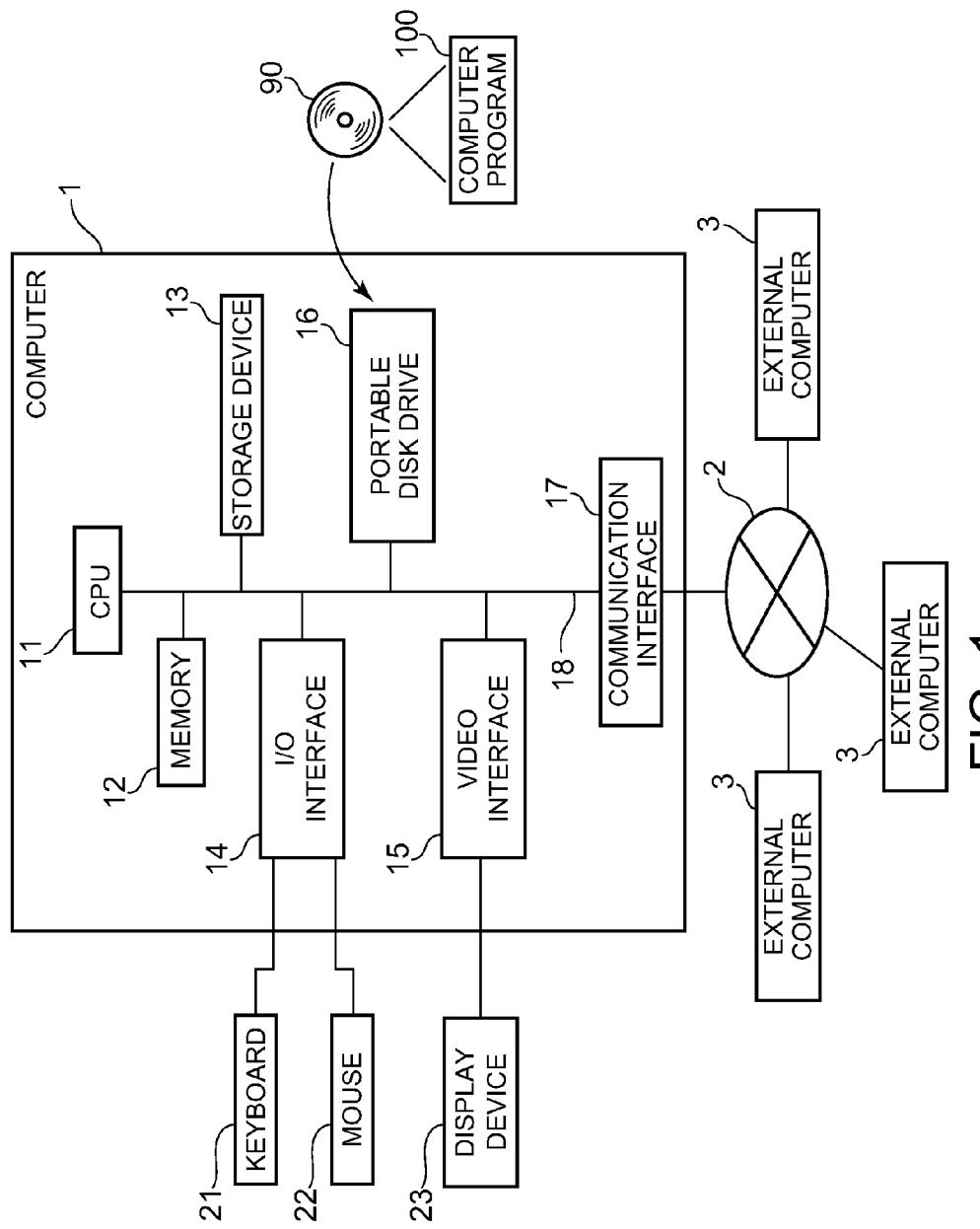
FIG. 1 is a block diagram illustrating an example of constructing a computer, which contains a forced termination inhibiting device according to a first embodiment of the present invention, by using a CPU.

Hereinafter, a device having resistance to a forced termination attack on a monitoring program for monitoring a predetermined resource according to embodiments of the present invention will be described in detail with reference to the accompanying drawings. It should be understood that the embodiments mentioned below are not intended to limit the invention described in the Claims, and all combinations of features to be described in the embodiments are not essential for means for solving the problems.

Moreover, the present invention can be performed in many different ways and should not be construed as limited to the described embodiments. Like reference numerals denote like elements throughout the embodiments.

Although a detailed description will be given in the following embodiments on a forced termination inhibiting device in which a computer program is installed in a computer system, as apparent to those skilled in the art, the present invention is able to be implemented as a computer program a part of which is able to be executed by a computer. Therefore, the present invention is able to be implemented in an embodiment as hardware which is a device having resistance to a forced termination attack on a monitoring program for monitoring a predetermined resource, an embodiment as software, or an embodiment as a combination of software and hardware. The computer program is able to be recorded in any recording medium, readable by any computer, such as a hard disk, a DVD, a CD, an optical storage device, or a magnetic storage device.

According to the embodiments of the present invention, even if a monitoring program which monitors a predetermined resource is forcibly terminated, the computer itself is not able to operate and therefore the computer is prevented from being attacked by defacing, impersonation, or the like from the outside. In addition, even if the monitoring program is in operation, the corresponding process is not displayed on a process list, and therefore it is also possible to reduce possibility that the monitoring program is subjected to a forced termination attack by a third party.

First Embodiment

Referring to FIG. 1, there is shown a block diagram illustrating an example that a computer, which contains a forced termination inhibiting device according to a first embodiment of the present invention, is constructed by using a CPU. The computer 1, which contains the forced termination inhibiting device according to the first embodiment of the present invention, is connected to a plurality of external computers 3, 3, - - - so as to be able to perform data communication via a network 2.

The computer 1 includes, at least, a CPU 11 (central processing unit), a memory 12, a storage device 13, an I/O interface 14, a video interface 15, a portable disk drive 16, a communication interface 17, and an internal bus 18 which connects the aforementioned hardware units to each other.

The CPU 11, which is connected to the aforementioned hardware units of the computer 1 via the internal bus 18, controls the operations of the above hardware units and performs various software-like functions according to a computer program 100 stored in the storage device 13. The memory 12 is formed of a volatile memory such as an SRAM or an SDRAM. A load module is loaded into the memory 12 at the time of execution of the computer program 100, and the memory 12 stores temporal data and the like generated during execution of the computer program 100.

The storage device 13 includes a built-in fixed-type storage device (hard disk), a ROM, or the like. The computer program 100 stored in the storage device 13 is downloaded from a portable recording medium 90, such as a DVD or a CD-ROM, on which the program and information such as data are recorded, through the portable disk drive 16, and for execution, loaded from the storage device 13 into the memory 12. Naturally, the computer program may be downloaded from any of the external computers 3, 3, - - - connected to the network 2 through the communication interface 17.

The communication interface 17 is connected to the internal bus 18, so that it can exchange data with the external computers 3, 3, - - - or the like by being connected to the external network 2 such as the Internet, LAN, or WAN.

The I/O interface 14 is connected to data input media, such as a keyboard 21 and a mouse 22, to receive data input. The video interface 15 is connected to a display device 23, such as a CRT monitor or an LCD, to display predetermined images.

Figure 2:
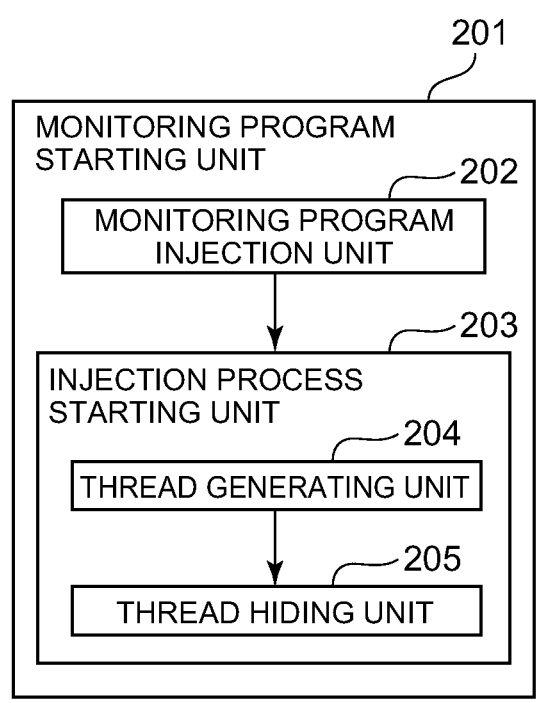
FIG. 2 is a functional block diagram of a computer which contains the forced termination inhibiting device according to the first embodiment of the present invention.

Hereinafter, a description will be given on the operation for a forced termination attack on the monitoring program by the external computers 3 in the computer 1 having the above configuration. Referring to FIG. 2, there is shown a functional block diagram of the computer 1 which contains the forced termination inhibiting device according to the first embodiment of the present invention.

The description will be given on the assumption that the computer 1 uses Windows® manufactured by Microsoft as an operating system and that the monitoring program is implemented as a dynamic link library (DLL). Naturally, it goes without saying that the operating system is not limited to Windows® manufactured by Microsoft, but Linux or any other operating system may be used.

In FIG. 2, a monitoring program starting unit (monitoring program starting means) 201, which starts the monitoring program in response to an execution of a predetermined process, has a monitoring program injection unit 202, an injection process starting unit 203, a thread generating unit 204, and a thread hiding unit 205.

The monitoring program injection unit 202 injects a monitoring program implemented as a DLL into a process which is not allowed to use a resource to be monitored by the monitoring program in the case of termination. The process, which is not allowed to use a resource to be monitored by the monitoring program in the case of termination, means a logon process for controlling logon/logoff to/from a monitoring program monitoring the computer main body, a network process for a monitoring program monitoring a network, a browser process for a monitoring program monitoring webs, or the like, for example.

In the first embodiment, a registry (AppInit_DLLs) of the operating system is used. Thereby, the operating system is started and the monitoring program implemented as a DLL is loaded.

The means for "injecting" the monitoring program into a predetermined process is not particularly limited to a registry, but it is possible to use a DLL "GINA (msgina.dll)" for loading a monitoring program simultaneously with displaying a login screen which is a function specific to Windows® or to use a message hook.

The injection process starting unit 203 starts the process, into which the monitoring program has been injected, to load the injected monitoring program. Although a method of loading the monitoring program is not particularly limited, a new thread is generated and the monitoring program is run within the new generated thread (hereinafter, referred to as "derived thread") in the first embodiment. Naturally, the monitoring program may be automatically loaded from the operating system.

The thread generating unit 204 generates a new derived thread and runs the monitoring program within the new generated derived thread. More specifically, the derived thread is integral with the process which has generated the derived thread, and in the case where a forced termination attack is launched on the derived thread from the outside and the derived thread is terminated, the process itself serving as the basis also terminates. Therefore, as long as the process, which has generated the new derived thread including the monitoring program, is a process which is not allowed to use the predetermined resource to be monitored by the monitoring program, it becomes impossible to use the predetermined resource by the termination of the derived thread.

For example, if the process which has generated the new derived thread, in other words, the process into which the monitoring program has been injected is a logon process (winlogon.exe) and if the monitoring program is attacked from the outside to forcibly terminate the derived thread and then the derived thread is forcibly terminated, the logon process also terminates and therefore no one can use the computer 1 unless the computer 1 is restarted. Therefore, even if a forced termination attack is launched on the monitoring program from the outside, it is possible to prevent the resources in the computer 1 from being attacked by defacing, impersonation, or the like.

The priority level of the derived thread is preferably lower than that of the main thread generated by the predetermined process into which the monitoring program has been injected. For example, if the process in which the monitoring program has been injected is a logon process (winlogon.exe), the priority level of the new generated derived thread is set lower than the priority level of the main thread which controls the logon. This enables a reduction of the possibility that the monitoring program hinders the logon process operation.

Figure 3:
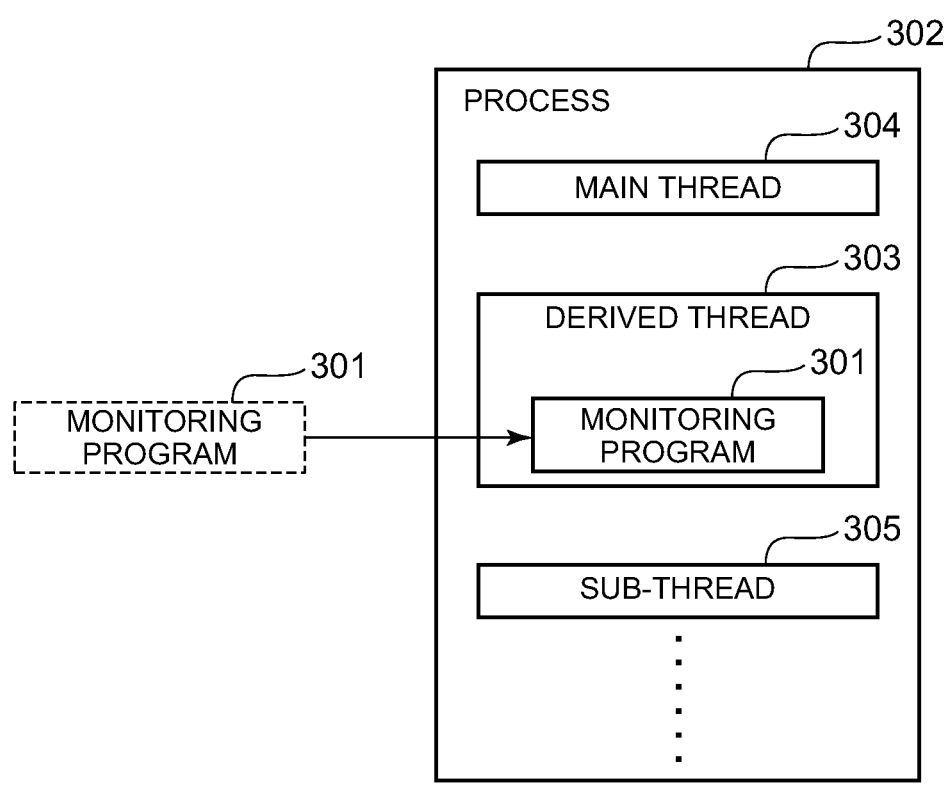
FIG. 3 is a pattern diagram for describing the process injection of a monitoring program of the computer which contains the forced termination inhibiting device according to the first embodiment of the present invention.

Referring to FIG. 3, there is shown a pattern diagram for describing the process injection of the monitoring program of the computer 1 which contains the forced termination inhibiting device according to the first embodiment of the present invention. The computer 1 injects a monitoring program 301 into a process 302 which is not allowed to use a predetermined resource to be monitored by the monitoring program 301 in the case of termination. The process 302 generates a main thread 304 and a plurality of sub-threads 305, 305, - - - at startup and further generates a new derived thread 303 including the injected monitoring program 301.

Figure 4:
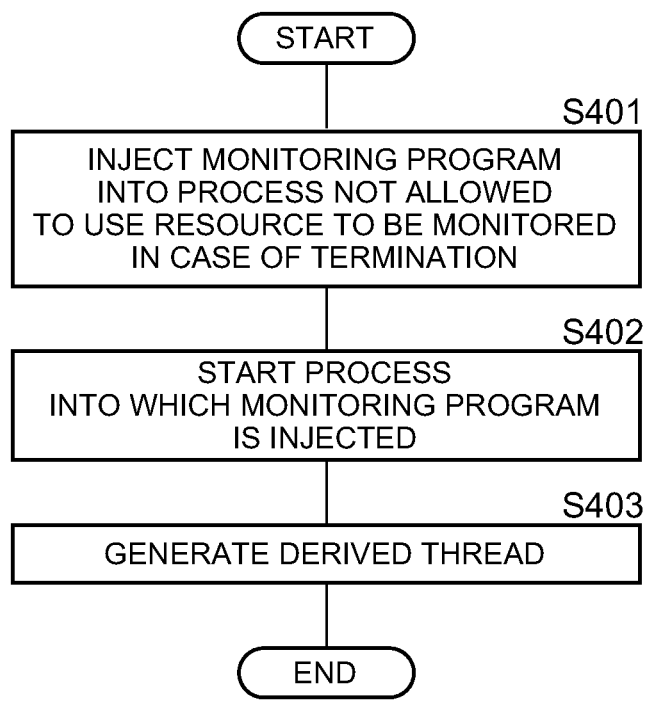
FIG. 4 is a flowchart illustrating a CPU processing procedure of the computer which contains the forced termination inhibiting device according to the first embodiment of the present invention.

Referring to FIG. 4, there is shown a flowchart illustrating a processing procedure of the CPU 11 of the computer 1 which contains the forced termination inhibiting device according to the first embodiment of the present invention. The CPU 11 of the computer 1 injects the monitoring program implemented as a DLL into a process which is not allowed to use a predetermined resource to be monitored by the monitoring program in the case of termination (step S401). The timing of injecting the monitoring program is not particularly limited. It is, however, preferable to inject the monitoring program at the time of startup of the operating system, because it does not generate the timing of causing the computer to be helpless against the forced termination attack from the outside.

The CPU 11 starts the process into which the monitoring program has been injected (step S402). The process is started and the injected monitoring program is loaded into the execution area of the memory 12.

The CPU 11 generates a new derived thread (step S403) to start the loaded monitoring program within the new generated derived thread. The priority level of the derived thread is preferably lower than the priority level of the main thread generated by the predetermined process into which the monitoring program has been injected, because it reduces the possibility that the operation of the predetermined process is hindered.

Moreover, preferably the presence of the derived thread is hidden from the outside. The thread hiding unit (thread information deleting means) 205 in FIG. 2 deletes information for identifying the new generated derived thread such as, for example, a thread ID from return values of the thread extraction functions for extracting information for identifying threads running in the operating system. Specifically, the thread hiding unit 205 deletes the thread ID from the return values in the case of listing the threads present in the process by executing an API hook for the EnumThreads, ToolHelp32, or the like which are thread list APIs of Windows®.

Figure 5:
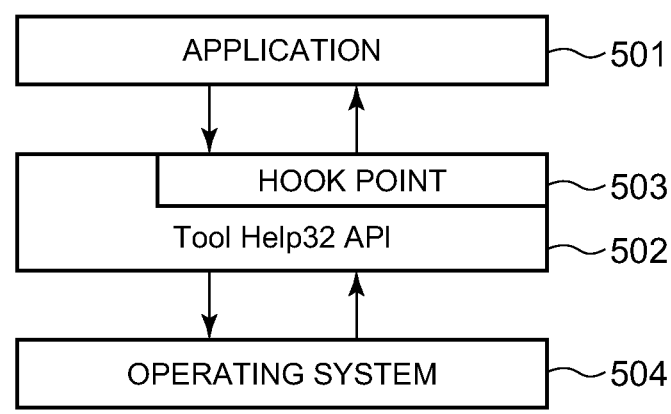
FIG. 5 is a module configuration diagram for describing a procedure for hiding a derived thread of the computer which contains the forced termination inhibiting device according to the first embodiment of the present invention.

Referring to FIG. 5, there is shown a module configuration diagram for describing a procedure for hiding the derived thread of the computer 1 which contains the forced termination inhibiting device according to the first embodiment of the present invention. As shown in FIG. 5, an application 501 calls API, "ToolHelp32 API" 502, first. A hook point 503 in the "ToolHelp32 API" 502 detects the call from the application 501 and calls the corresponding API in the operating system 504.

Since the corresponding API in the operating system 504 is to return thread IDs, which are information for identifying threads present as return values, to the application 501, the "ToolHelp32 API" 502 first receives the return values, which are to be sent to the application 501, deletes a thread ID which is information for identifying the new derived thread from the received return values, and then passes the return values without deleted thread ID to the application 501. Thereby, in spite of the fact that the derived thread is actually running in the operating system 504, the derived thread is deleted from the return values of the "ToolHelp32 API" 502, and therefore, in the application 501, the listed thread IDs do not include the thread ID corresponding to the new derived thread. Accordingly, it is possible to hide the presence of the derived thread.

As described hereinabove, according to the first embodiment of the present invention, it is possible to suppress the forced termination attack from the outside on the monitoring program by causing the monitoring program to be included in a process, which is not allowed to use the computer 1 itself unless it is normally running like a logon process. More specifically, even if the monitoring program is forcibly terminated, an external third party is not able to launch an attack such as defacing or impersonation of resources in the computer 1.

Moreover, even if the process including the derived thread which includes the monitoring program is running, it is possible to inhibit the process including the derived thread from being displayed on the process list showing the running processes. Therefore, it is also possible to prevent an external third party from directly launching a forced termination attack on the process including the derived thread.

Second Embodiment

Although the monitoring program is injected into the logon process in the computer 1 which contains the forced termination inhibiting device according to the first embodiment, the second embodiment differs from the first embodiment in that the monitoring program which monitors a predetermined resource is a monitoring target. Since the configuration example and functional block of the computer 1 which contains a forced termination inhibiting device according to the second embodiment are the same as those of the computer 1 which contains the forced termination inhibiting device according to the first embodiment, detailed description will be omitted herewith the same reference numerals used for the same parts.

Figure 6:
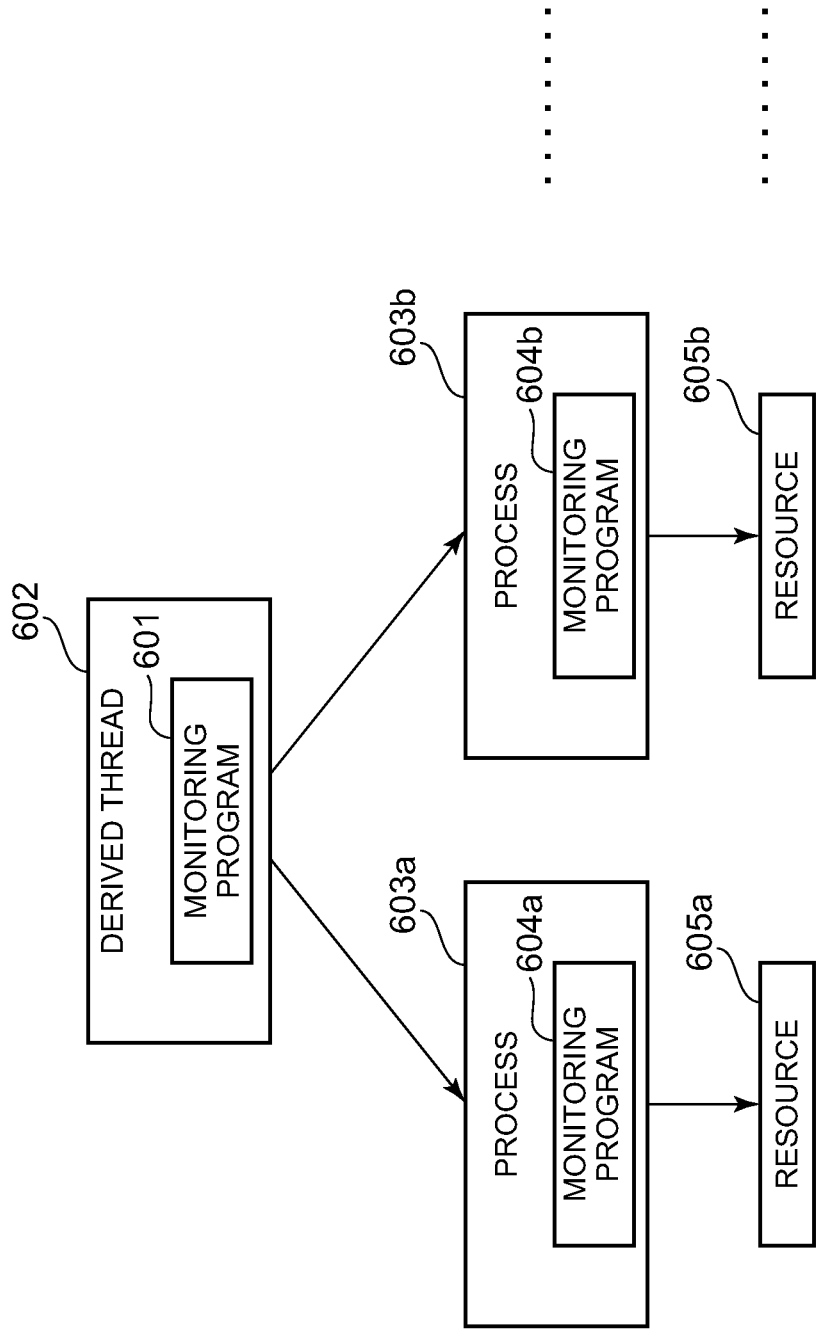
FIG. 6 is a pattern diagram illustrating a relationship between programs which run in computers each containing a forced termination inhibiting device according to a second embodiment of the present invention.

FIG. 6 shows a pattern diagram illustrating a relationship between programs which run in computers 1 each containing the forced termination inhibiting device according to the second embodiment of the present invention. As shown in FIG. 6, a monitoring program 601 injected into a process, which is not allowed to use a predetermined resource to be monitored by the monitoring program in the case of termination, runs along with a derived thread 602 generated when the process is started.

The monitoring targets of the monitoring program 601 are other monitoring programs 604a, 604b, - - - running in other processes 603a, 603b, - - -, and the monitoring program 601 detects whether other monitoring programs 604a, 604b, - - - have been forcibly terminated and, if detecting any forced termination, restarts the corresponding monitoring programs.

Other monitoring programs 604a, 604b, - - -, which are monitoring targets of the monitoring program 601, are monitoring resources 605a, 605b, - - -, respectively. If the monitoring programs 604a, 604b, - - - are subject to a forced termination attack from the outside, the monitoring programs 604a, 604b, - - - are not able to monitor the resources and therefore are not able to detect an attack, even if it is an attack such as defacing, impersonation, or the like from the outside. The monitoring program 601, however, is able to detect that other monitoring programs 604a, 604b, - - - have been forcibly terminated due to the forced termination attack from the outside, and therefore it is possible to immediately restart the monitoring programs 604a, 604b, - - - which have been forcibly terminated and to protect the monitoring programs 604a, 604b, - - - from the attack such as defacing, impersonation, or the like from the outside.

As described hereinabove, according to the second embodiment, one monitoring program is able to monitor a plurality of monitoring programs such as, for example, a monitoring program for a file access or a monitoring program for a print status. Therefore, even if any monitoring program is forcibly terminated due to a forced termination attack from the outside, it is possible to restart the monitoring program.

Third Embodiment

Although a user selects a process, into which a monitoring program is injected, in the computer 1 which contains the forced termination inhibiting device according to the first and second embodiments, the third embodiment differs from the first and second embodiments in that the computer 1 automatically selects a process into which the monitoring program is to be injected. Since the configuration example of the computer 1 which contains a forced termination inhibiting device according to the third embodiment is the same as that of the computer 1 which contains the forced termination inhibiting device according to the first and second embodiments, detailed description will be omitted herewith the same reference numerals used for the same parts.

Figure 7:
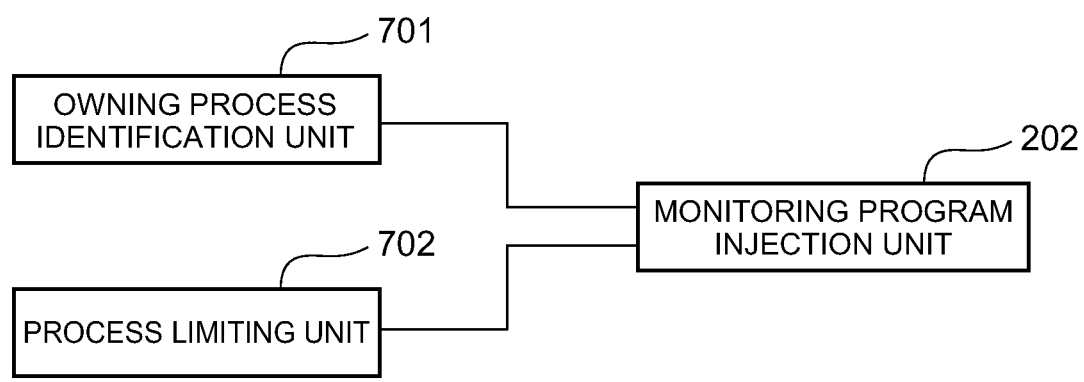
FIG. 7 is a functional block diagram of a computer which contains a forced termination inhibiting device according to a third embodiment of the present invention.

FIG. 7 shows a functional block diagram of the computer 1 which contains the forced termination inhibiting device according to the third embodiment of the present invention. An owning process identification unit 701 identifies a process which owns a predetermined resource to be monitored. For example, it means a process which owns a session, a process which owns a desktop, or the like.

More specifically, when the monitoring program monitors a drive, a clipboard, or the like if the operating system is Windows®, a process winlogin.exe, which owns a session, is a process into which the monitoring program is injected. Moreover, in the case where the monitoring program monitors shell operations, Explorer.exe which owns a desktop is a process into which the monitoring program is injected.

On the other hand, unless it is possible to identify a process which owns a predetermined resource to be monitored, a process limiting unit 702 limits the processes into which the monitoring program is injected. The process into which the monitoring program is injected is preferably a process which is started at the earliest time and runs to the end among a plurality of processes within the same session. It is because the time during which the monitoring program runs is the longest and security is the highest.

Moreover, unless it is possible to limit the processes to one, the process limiting unit 702 may limit the processes to a plurality of injection candidate processes, which are to be candidates into which the monitoring program is injected, and then inject the monitoring program into a common parent process or a high-level process of the plurality of limited injection candidate processes. Further, it is also possible to inject the monitoring program into a plurality or all of processes, instead of injecting the monitoring program into only one process, so that at least one of the processes runs, in other words, so that at least one monitoring program runs without fail.

The monitoring program injection unit 202 injects the monitoring program into a process identified by the owning process identification unit 701 or a process limited and identified by the process limiting unit 702.

Figure 8:
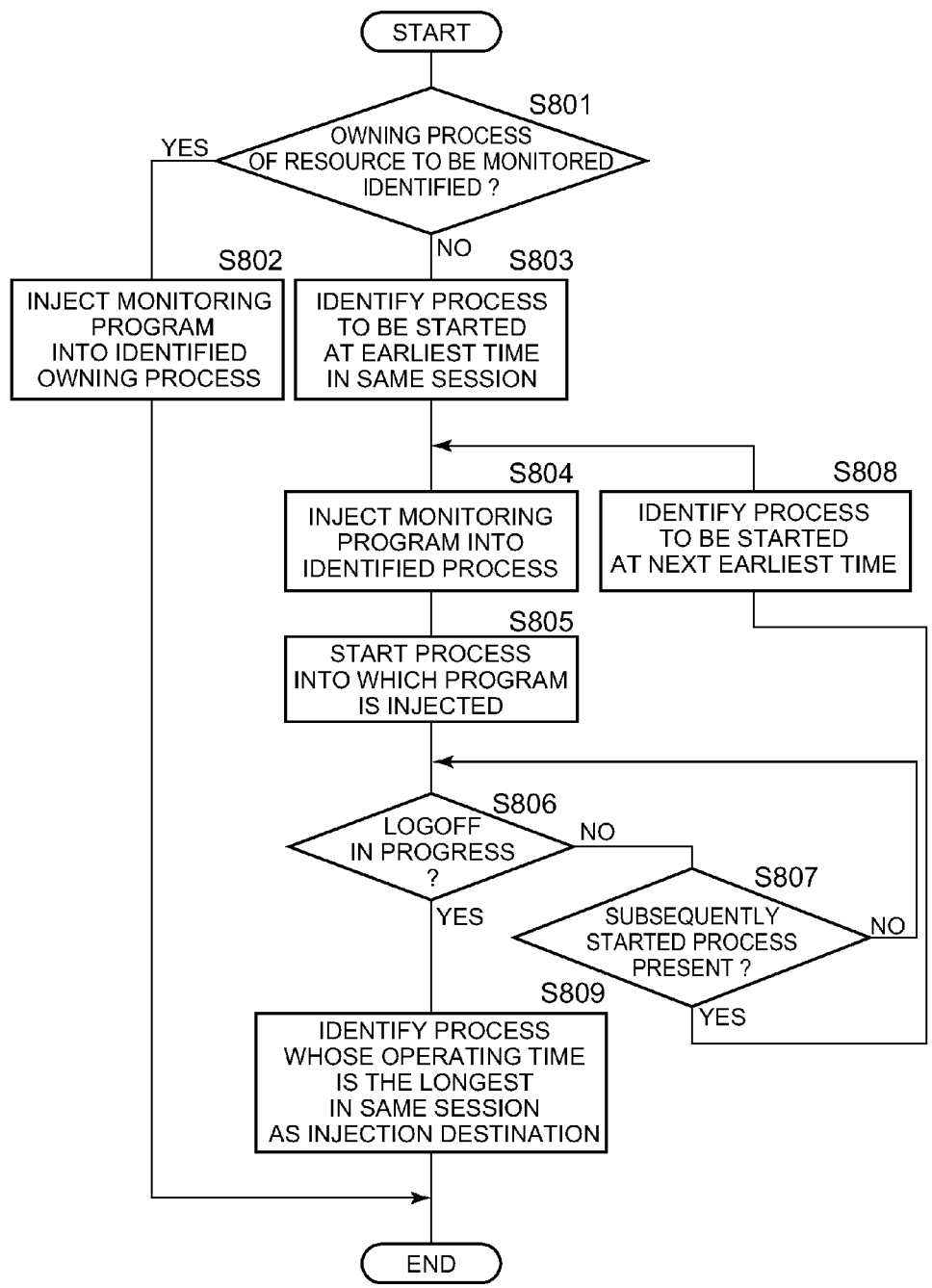
FIG. 8 is a flowchart illustrating a procedure for injection process identification processing of the CPU of the computer which contains a forced termination inhibiting device according to the third embodiment of the present invention.

FIG. 8 shows a flowchart illustrating a procedure for injection process identification processing of the CPU 11 of the computer 1 which contains the forced termination inhibiting device according to the third embodiment of the present invention. In FIG. 8, the CPU 11 of the computer 1 determines whether it is possible to identify an owning process which owns a predetermined resource to be monitored (step S801).

If the CPU 11 determines that it is possible to identify the owning process (step S801: YES), the CPU 11 identifies the owning process and injects the monitoring program into the identified owning process (step S802). If the CPU 11 determines that it is impossible to identify the owning process (step S801: NO), the CPU 11 identifies a process which is to be started at the earliest time within the same session (step S803).

The CPU 11 injects the monitoring program into the identified process (step S804) and starts the process into which the monitoring program has been injected (step S805). The CPU 11 determines whether the logoff is in progress (step S806). If the CPU 11 determines that the logoff is not in progress (step S806: NO), the CPU 11 determines whether a process to be subsequently started is present (step S807). Unless the CPU 11 determines that the process to be subsequently started is present, in other words, if the CPU 11 determines that all processes have been started (step S807: NO), the CPU 11 returns processing to step S806 and enters a wait state for the logoff processing.

If the CPU 11 determines that the process to be subsequently started is present (step S807: YES), the CPU 11 identifies a process to be started at the next earliest time (step S808), returns processing to step S804, and repeats the above-described processing. This enables the monitoring program to run in a plurality of processes and the operating time of each process to be acquired.

If the CPU 11 determines that the logoff is in progress (step S806: YES), the CPU 11 identifies the process whose operating time is the longest in the same session as an injection destination process into which the monitoring program is injected next time (step S809). Thereby, it is possible to identify the process, which is started at the earliest time and runs to the end among the plurality of processes within the same session, as an injection destination process into which the monitoring program is injected next time.

As described hereinabove, according to the third embodiment of the present invention, it is possible to automatically identify the process into which the monitoring program is injected and to suppress the forced termination attack from the outside on the monitoring program by causing the monitoring program to be included in the most effective process, which is not allowed to use the computer 1 itself unless it is normally running like a logon process.

The present invention is not limited to the above embodiments, but various alterations or modifications may be made to the foregoing within the scope of the present invention. For example, the method of injecting the monitoring program into the process may be altered to the most effective method according to the operating system installed in the computer 1.

DESCRIPTION OF REFERENCE NUMERALS

1 Computer
2 Network
3 External computer
11 CPU
12 Memory
13 Storage device
14 I/O interface
15 Video interface
16 Portable disk drive
17 Communication interface
18 Internal bus
23 Display device
90 Portable recording medium
100 Computer program

The invention claimed is:

1. A system, comprising:
a memory;
a processor coupled to the memory;
a predetermined process executed by the processor including a monitoring program that monitors a predetermined resource, wherein the predetermined process is a process for which the predetermined resource becomes unavailable in response to termination of the predetermined process;
a program starting unit executed by the processor that starts the monitoring program and generates a new thread in response to an execution of the predetermined process, wherein the monitoring program is executed within the new thread;
a terminator executed by the processor that terminates the predetermined process in the case where the monitoring program is forcibly terminated from the outside; and
a thread hiding unit executed by the processor that deletes information for identifying the new thread from return values of a thread extraction program for extracting information for identifying running threads.

2. The system of claim 1, wherein:
the monitoring program is implemented as a dynamic link library; and
the dynamic link library is injected into the predetermined process.

3. The system of claim 1, wherein:
the predetermined resource is a computer unit which executes the monitoring program; and
the predetermined process is a process which controls logon/logoff to/from the computer unit.

4. The system according to one of claims 1, wherein:
the predetermined resource is another monitoring program which monitors another resource; and
the monitoring program at least one of detects a forced termination of the another monitoring program and restarts the another monitoring program.

* * * * *